(12) United States Patent
Yoshida et al.

(10) Patent No.: US 9,253,517 B2
(45) Date of Patent: Feb. 2, 2016

(54) NETWORKED DATA PROJECTING SYSTEM, PROJECTOR, AND CONTENT PROJECTING METHOD

(75) Inventors: Eiichiro Yoshida, Kanagawa (JP); Makoto Torikoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 673 days.

(21) Appl. No.: 13/572,773

(22) Filed: Aug. 13, 2012

(65) Prior Publication Data

US 2013/0067037 A1    Mar. 14, 2013

(30) Foreign Application Priority Data

Sep. 13, 2011  (JP) ................................. 2011-199586

(51) Int. Cl.
| | |
|---|---|
| G06F 15/16 | (2006.01) |
| H04N 21/258 | (2011.01) |
| H04N 21/41 | (2011.01) |
| H04N 21/414 | (2011.01) |
| H04N 21/418 | (2011.01) |
| H04N 21/658 | (2011.01) |
| H04N 21/472 | (2011.01) |

(52) U.S. Cl.
CPC ..... H04N 21/25816 (2013.01); H04N 21/4113 (2013.01); H04N 21/4122 (2013.01); H04N 21/4182 (2013.01); H04N 21/41415 (2013.01); H04N 21/47202 (2013.01); H04N 21/6581 (2013.01)

(58) Field of Classification Search
None
See application file for complete search history.

(56) References Cited

U.S. PATENT DOCUMENTS

| | | | | |
|---|---|---|---|---|
| 7,543,043 | B2 * | 6/2009 | Noda et al. .................... | 709/220 |
| 2006/0075348 | A1 * | 4/2006 | Xu et al. ........................ | 715/730 |
| 2008/0229327 | A1 | 9/2008 | Yoshida | |
| 2010/0125353 | A1 * | 5/2010 | Petit-Huguenin ............... | 700/94 |
| 2013/0007579 | A1 * | 1/2013 | Dancy et al. .................. | 715/205 |

FOREIGN PATENT DOCUMENTS

| | | |
|---|---|---|
| JP | 2002-290605 | 10/2002 |
| JP | 2009-212657 | 9/2009 |
| WO | WO2009/110435 A1 | 9/2009 |

* cited by examiner

*Primary Examiner* — Scott B Christensen
(74) *Attorney, Agent, or Firm* — IPUSA, PLLC

(57) ABSTRACT

A networked data projecting system includes a server for storing one or more content items, a projector for projecting a projection content item selected from the content items, and an information processing terminal. The projector includes an IC card terminal, and a projection content identifier storing unit for storing a projection content identifier of the projection content item in the IC card when the IC card is held over the IC card terminal while the projection content item is being projected by the projector. The information processing terminal includes a projection content requesting unit for reading the projection content identifier stored in the IC card and sending the projection content identifier to the server. The server includes a projection content transmitting unit for sending the projection content item corresponding to the projection content identifier to the information processing terminal.

11 Claims, 14 Drawing Sheets

FIG.7A

| PROJECTION CONTENT IDENTIFIER | FILE NAME | OWNER | DATE |
|---|---|---|---|
| c-id 1 | monthly_report_A.ppt | tanaka | 2011/2/4 |
| c-id 2 | accounting_report_2011-01 | tanaka | 2011/2/4 |
| c-id 3 | accounting_report_2010-12 | tanaka | 2011/1/10 |
| c-id 4 | hoge | tanaka | 2011/2/5 |

FIG.7B

| CARD IDENTIFIER | PROJECTION CONTENT IDENTIFIER | FILE NAME | DATE |
|---|---|---|---|
| 04a-032 | a-id 1 | minutes_2011-01 | 2011/2/3 |
| 04a-032 | a-id 2 | minutes_2011-02 | 2011/3/1 |
| 04a-032 | a-id 3 | presentation01 | 2010/12/4 |
| 04a-061 | k-id 1 | marketing_trend01 | 2011/6/24 |
| 04a-061 | k-id 2 | marketing_trend02 | 2011/8/26 |
| 02c-005 | c-id 1 | monthly_report_2011-04 | 2011/5/2 |

FIG.7C

| PROJECTION CONTENT | PROJECTION CONTENT IDENTIFIER | FILE NAME | OWNER |
|---|---|---|---|
| ◯ | a-id 1 | minutes_2011-01 | suzuki |
| | a-id 2 | minutes_2011-02 | suzuki |
| | d-id 4 | minutes_2011-03 | satoh |
| | d-id 6 | minutes_2011-04 | satoh |
| | e-id 1 | proceedings_2011-01 | fukui |
| | g-id 4 | proceedings_2011-02 | saitoh |

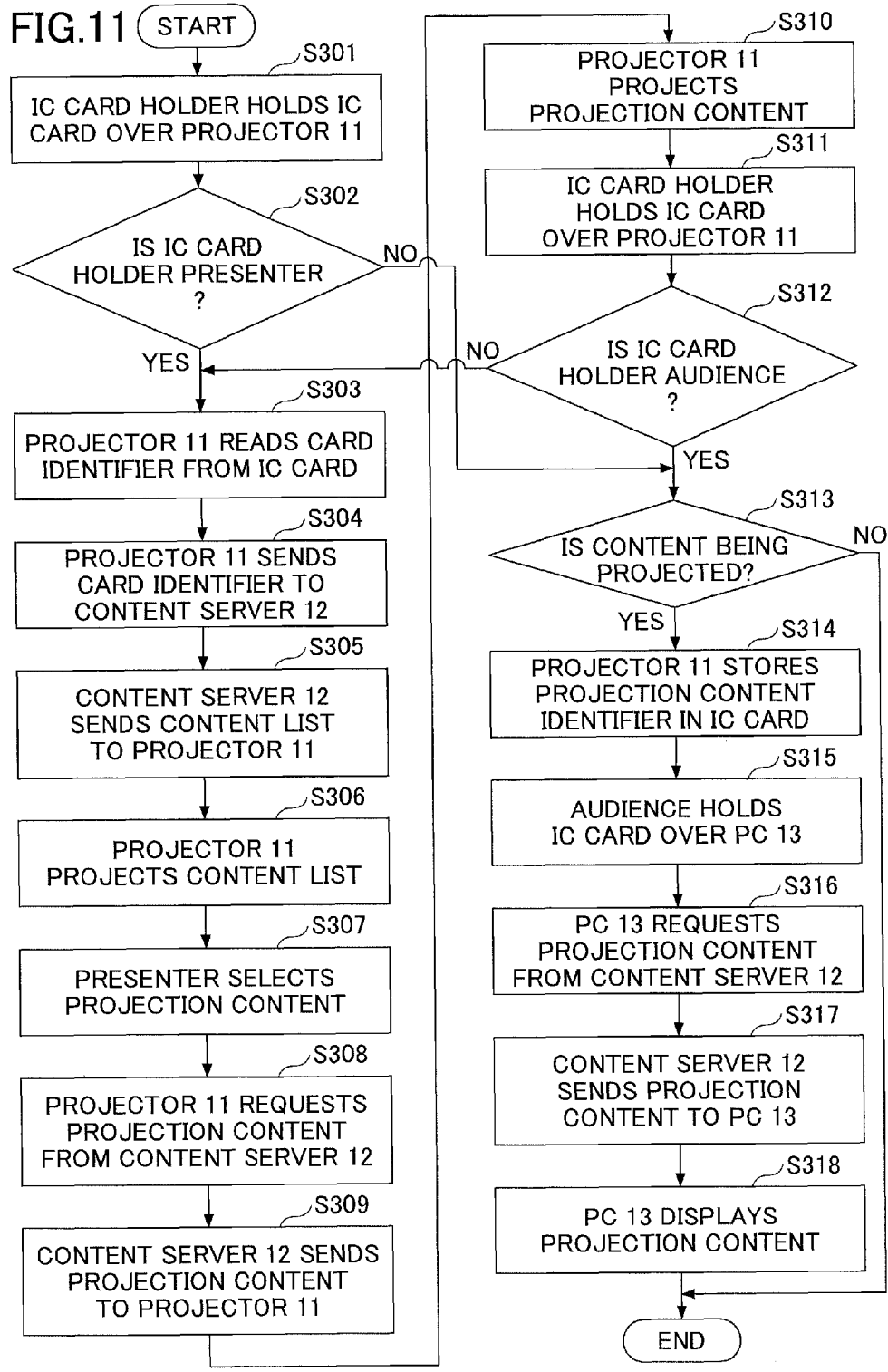

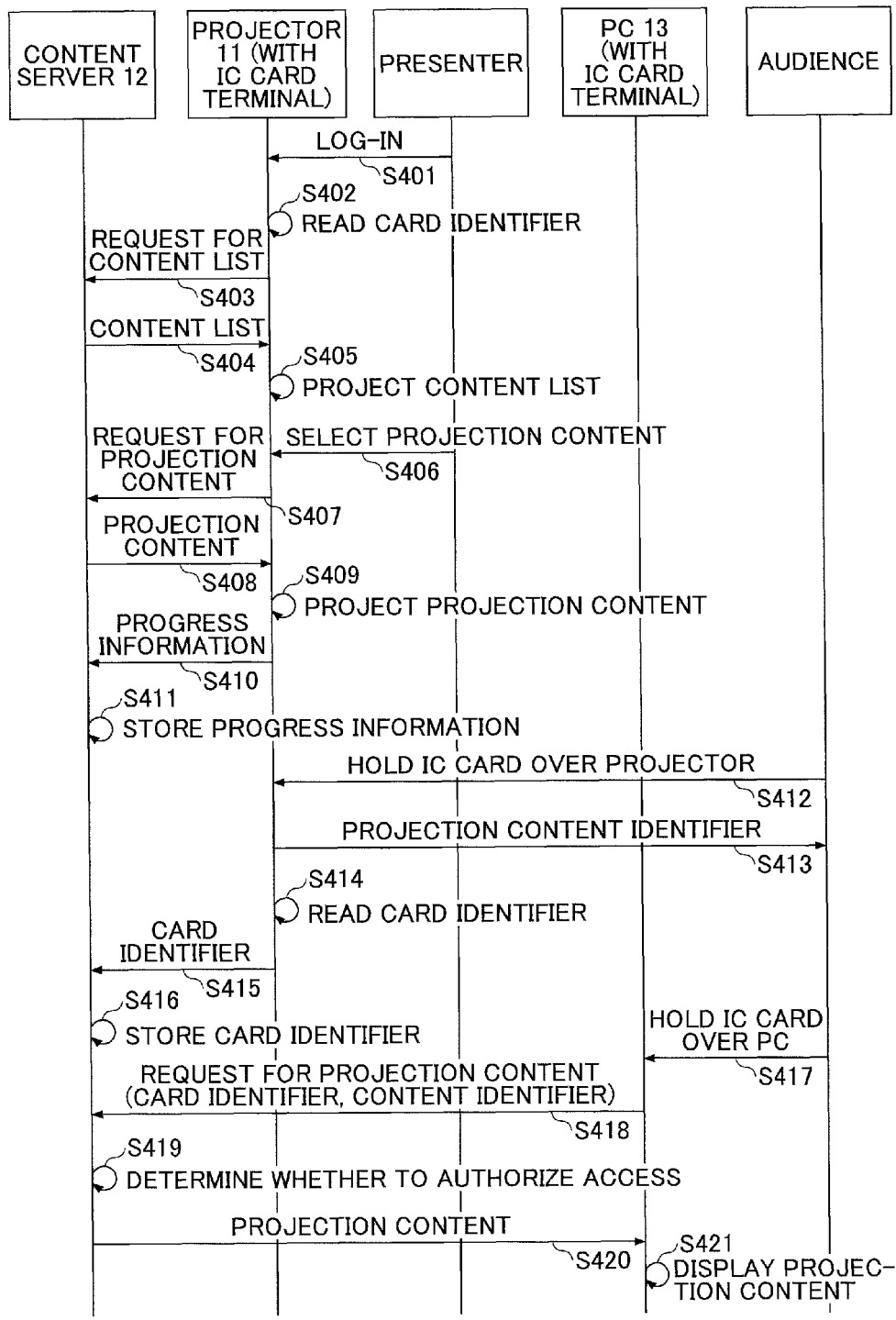

NETWORKED DATA PROJECTING SYSTEM, PROJECTOR, AND CONTENT PROJECTING METHOD

CROSS-REFERENCE TO RELATED APPLICATION

The present application is based upon and claims the benefit of priority of Japanese Patent Application No. 2011-199586, filed on Sep. 13, 2011, the entire contents of which are incorporated herein by reference.

BACKGROUND OF THE INVENTION

1. Field of the Invention

An aspect of this disclosure relates to a networked data projecting system, a projector, and a content projecting method.

2. Description of the Related Art

In a meeting at an office, it is common to project documents onto a screen to allow participants of the meetings to view the documents. It is also a known technology to allow the participants to obtain the projected documents by accessing an external server storing the documents, and display the obtained documents on personal computers (PCs) placed in front of the participants.

In the descriptions below, a person performing a presentation at a meeting is referred to as a "presenter", and other participants of the meeting are referred to as an "audience". In a technology disclosed in Japanese Laid-Open Patent Publication No. 2002-290605, a presenter stores a document used for a presentation in a server. At an external place (e.g., an office of a client), the presenter accesses the server using a mobile terminal including a projector, retrieves the document from the server, and projects the document to perform a presentation before the audience. The presenter gives the audience access key information for accessing the server, and thereby allows the audience to obtain the document used for the presentation from the server.

With the technology disclosed in JP2002-290605, however, the audience needs to obtain the access key information and manually enter the obtained access key information in PCs, for example, to obtain the document from the server. Accordingly, it is troublesome for the audience to perform such manual operations during a presentation. Also, for the audience visiting the place where the presentation is being performed, it may not be practical to obtain the document from the server due to network limitations or restrictions.

SUMMARY OF THE INVENTION

In an aspect of this disclosure, there is provided a networked data projecting system including a server configured to store one or more content items, a projector connected to the server and configured to project a projection content item selected from the content items stored in the server, and an information processing terminal connected to the server. The projector includes an IC card terminal configured to read and write information from and to an IC card, and a projection content identifier storing unit configured to store a projection content identifier of the projection content item in the IC card when the IC card is held over the IC card terminal while the projection content item is being projected by the projector. The information processing terminal includes a projection content requesting unit configured to read the projection content identifier stored in the IC card and send the projection content identifier to the server to request the projection content item corresponding to the projection content identifier. The server includes a projection content transmitting unit configured to send the projection content item corresponding to the projection content identifier to the information processing terminal.

BRIEF DESCRIPTION OF THE DRAWINGS

FIGS. 7A through 7C are tables illustrating an exemplary configuration of a content database;

FIG. 11 is a flowchart illustrating an exemplary process performed in a networked data projecting system according to the first embodiment; and FIG. 12 is a sequence chart illustrating an exemplary process according to a second embodiment.

DESCRIPTION OF THE PREFERRED EMBODIMENTS

Preferred embodiments of the present invention are described below with reference to the accompanying drawings.

<<First Embodiment>>
<Configurations and Functions of Networked Data Projecting System>

Figure 1:
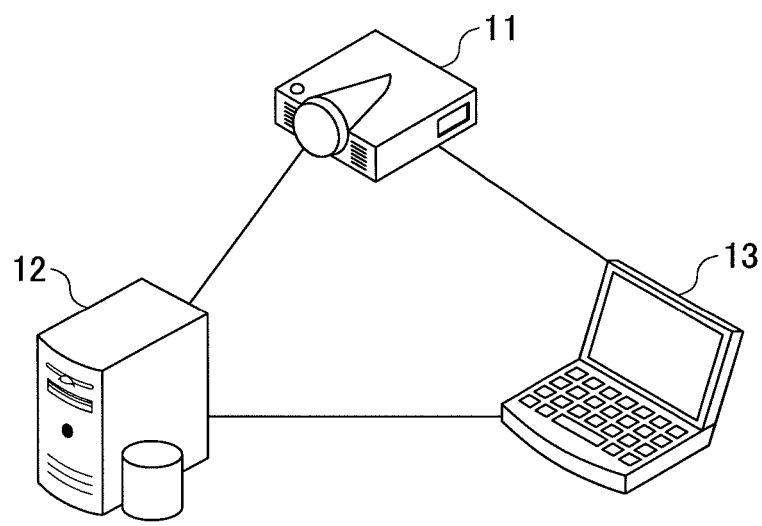
FIG. 1 is a drawing illustrating an exemplary configuration of a networked data projecting system.

A first embodiment is described below with reference to the accompanying drawings. FIG. 1 is a drawing illustrating an exemplary configuration of a networked data projecting system 1. FIG. 1 illustrates components of the networked data projecting system 1 that are necessary to describe the first embodiment.

The networked data projecting system 1 may include a projector 11, a content server 12, and a personal computer (PC) 13 that are connected to each other via a network.

The projector 11 obtains content items (e.g., images, slides, and documents) from the content server 12 and projects the obtained content items onto, for example, a screen. Hereafter, content items being or to be projected by the projector 11 may be referred to as "projection content items". The projector 11 may include an IC card terminal that reads and writes information from and into an IC card. The content server 12 manages content items.

The PC 13 is an information processing terminal that is operated by the audience such as a participant of a meeting. The PC 13 receives projection content items sent or distributed from the content server 12. When the audience includes two or more members, the networked data projecting system 1 may include plural PCs 13 for the respective members.

<Outline of Process Performed in Networked Data Projecting System>

When a presenter logs into the projector 11, the projector 11 requests the content server 12 to send a list of content items. When the projector 11 receives the list of content items from the content server 12, the presenter selects one of the content items in the list that is to be projected (i.e., a projection content item). The projector 11 obtains the projection content item from the content server 12 and projects the obtained projection content item.

While the projection content item is being projected, the audience holds an IC card over the IC card terminal of the projector 11. In response, the projector 11 stores an identifier of the projection content item into the IC card. Hereafter, an identifier of a projection content item is referred to as a "projection content identifier". Then, the audience holds the IC card over the PC 13, and the PC 13 obtains the projection content identifier from the IC card. The PC 13 sends the obtained projection content identifier to the content server 12 and thereby requests the corresponding projection content item. In response to the request (i.e., the projection content identifier), the content server 12 sends the projection content item to the PC 13. With the above described configuration, a projection content identifier of a projection content item is stored in an IC card, and a PC identifies the projection content item based on the projection content identifier in the IC card. This configuration allows the audience to easily obtain the projection content item, i.e., a document used for a presentation.

<Details of Process Performed in Networked Data Projecting System>

Figure 2:
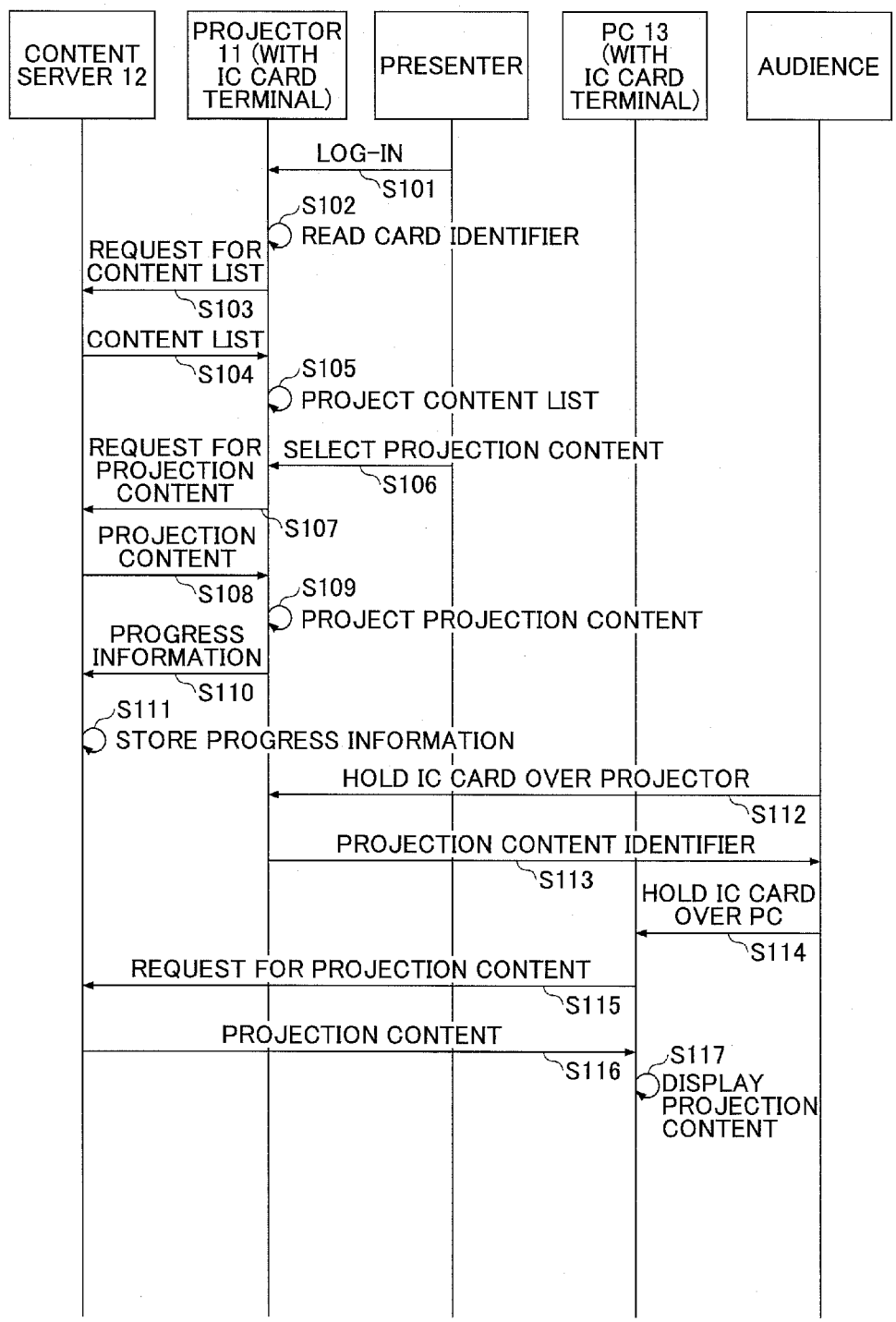
FIG. 2 is a sequence chart illustrating an exemplary process according to a first embodiment.

An exemplary process performed in the networked data projecting system 1 is described in detail below. FIG. 2 is a sequence chart illustrating an exemplary process according to the first embodiment.

First, a process initiated by the presenter is described. In step S101, the presenter holds an IC card over the IC card terminal of the projector 11 to log into the projector 11. When an IC card is held (or placed) over the IC card terminal, the projector 11 asks the holder of the IC card (hereafter referred to as an "IC card holder") whether he/she is a presenter or a member of the audience. For example, the projector 11 projects or displays a message "Are you a presenter? Yes or No", and requests the IC card holder to answer the question via, for example, an input unit of the projector 11.

When the IC card holder is a presenter, in step S102, the projector 11 reads, from the IC card, identification information of the IC card (hereafter referred to as a "card identifier"). In step S103, the projector 11 sends the card identifier to the content server 12, and thereby requests the content server 12 to send a list of content items (content list) that are stored in advance in the content server 12 in association with the card identifier.

In step S104, the content server 12 sends the list of content items to the projector 11. In step S105, the projector 11 projects the list of content items received from the content server 12. In step S106, the presenter selects one of the content items in the list as a projection content item. In step S107, the projector 11 requests the content server 12 to send the projection content item (i.e., the selected content item). In step S108, the content server 12 sends the requested projection content item to the projector 11. In step S109, the projector 11 projects the projection content item received from the content server 12.

While projecting the projection content item, in step S110, the projector 11 sends, to the content server 12, content projection progress information indicating the progress in projecting the projection content item (e.g., information indicating how many pages of the projection content item have been projected). In step S111, the content server 12 records or stores the content projection progress information.

Next, a process initiated by the audience is described. In step S112, while the projection content item is being projected, the audience holds an IC card over the IC card terminal of the projector 11. In step S113, the projector 11 stores an identifier (projection content identifier) of the projection content item into the IC card of the audience. In step S114, the audience holds the IC card over the PC 13, and the PC 13 reads the projection content identifier from the IC card. In step S115, the PC 13 sends the projection content identifier to the content server 12, and thereby requests the content server 12 to send data of the projection content item. In step S116, the content server 12 sends data of the projection content item corresponding to the projection content identifier to the PC 13. Then, in step S117, the PC 13 displays the projection content item received from the content server 12.

In the above exemplary process, the content projection progress information is sent in step S110 from the projector 11 to the content server 12 before step S112 where the audience holds the IC card over the projector 11. However, step S112 of holding the IC card over the projector 11 and the subsequent steps may be performed any time while the projection content item is being projected. Also, step S110 of sending the content projection progress information may be performed one or more times as needed.

<Variations>

The content server 12 may be configured to refer to the stored content projection progress information and to send only a part of the projection content item that has already been projected to the PC 13. For example, when four slides of a projection content item including 20 slides have already been projected, the content server 12 may send only the four slides to the PC 13. This configuration makes it possible to prevent the audience from reading pages of a document before those pages are projected.

Also, a polling method may be used to send data of a projection content item from the content server 12 to the PC 13. In this case, the content server 12 may be configured to regularly poll or interrogate the PC 13 requesting the projection content item and to automatically send, to the PC 13, the difference between parts of the projection content item that have been projected and parts of the projection content item that have already been sent to the PC 13.

The above configuration enables the presenter to display a list of content items by just holding an IC card over the projector 11, and to easily select a projection content item to be projected from the content items in the list. The above configuration also enables the audience to store a projection content identifier of a projection content item in an IC card by just holding the IC card over the IC card terminal of the projector 11, and to easily and reliably obtain data of the projection content item by holding the IC card over the PC 13.

<Hardware Configuration of Projector>

Figure 3:
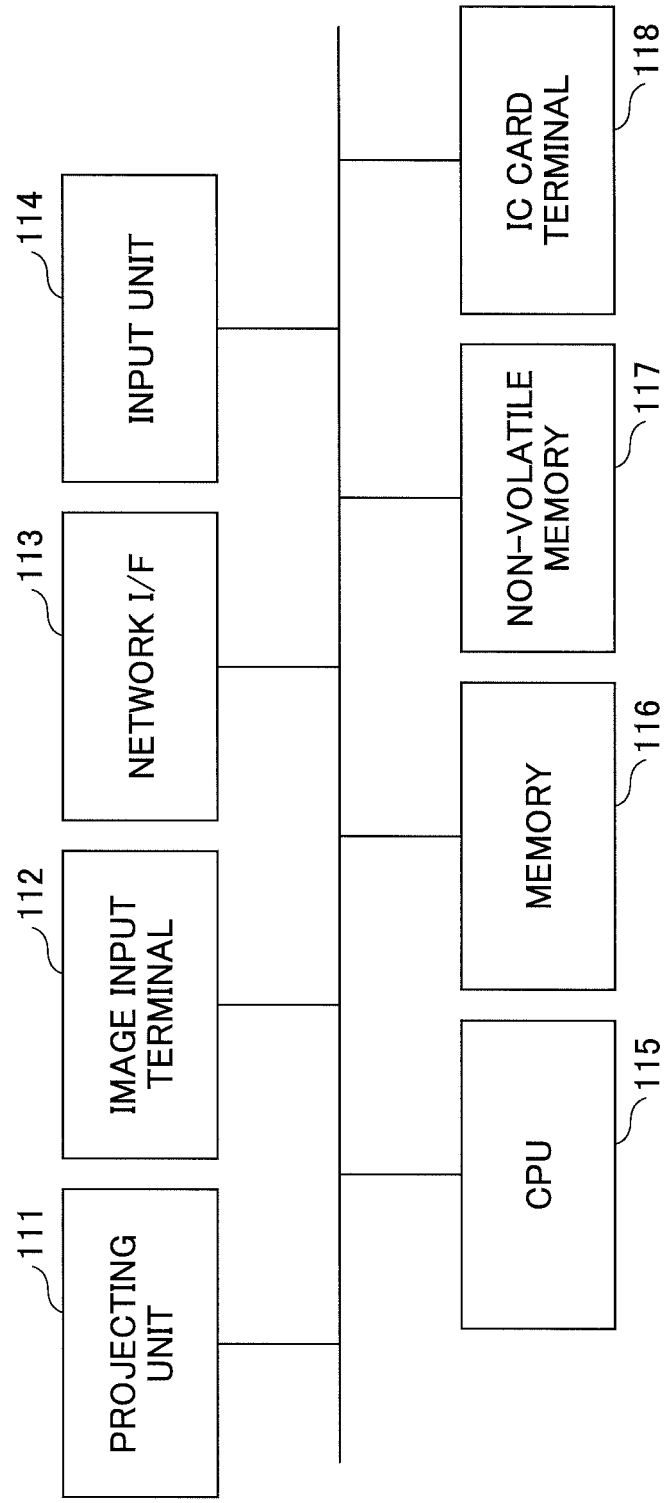
FIG. 3 is a block diagram illustrating an exemplary hardware configuration of a projector.

An exemplary hardware configuration of the projector 11 is described below with reference to FIG. 3.

The projector 11 may include a projecting unit 111, an image input terminal 112, a network I/F 113, an input unit 114, a CPU 115, a memory 116, a non-volatile memory 117, and an IC card terminal 118. The projecting unit 111 projects a content item onto, for example, a screen. The image input terminal 112 receives images of content items from the content server 12. The network I/F 113 is a network interface for connecting the projector 11 with the PC 13 and the content server 12. The input unit 114 includes, for example, buttons and a remote control reception unit, and receives direct inputs to the projector 11.

The CPU 115 is a central processing unit for controlling the projector 11. The memory 116 stores programs and data necessary for calculations and processing. The non-volatile memory 117 continuously (or permanently) stores programs and data. The IC card terminal 118 reads and writes information from and to IC cards.

<Process Performed by Hardware of Projector>

According to the present embodiment, the CPU 115 performs a process as described below. When an IC card is held (or placed) over the IC card terminal 118, the CPU 115 causes the projecting unit 111 to project a screen to ask the holder of the IC card (IC card holder) whether he/she is a presenter or a member of the audience. When the IC card holder enters, via the input unit 114, information indicating that the IC card holder is a presenter, the IC card terminal 118 reads a card identifier from the IC card. The CPU 115 sends the read card identifier via the network I/F 113 to the content server 12, and thereby requests the content server 12 to send a list of content items corresponding to the card identifier.

When receiving the list of content items from the content server 12, the CPU 115 causes the projecting unit 111 to project the list of content items and allows the presenter to select a projection content item from the list of content items. When the presenter selects a projection content item via the input unit 114, the CPU 115 requests the content server 12 via the network I/F 113 to send the selected projection content item. When the projection content item is received from the content server 12, the CPU 115 causes the projecting unit 111 to project the projection content item.

When an IC card is held over the IC card terminal 118 while the projection content item is being projected and information indicating that the IC card holder is a member of the audience is entered via the input unit 114, the IC card terminal 118 stores (or writes) the projection content identifier of the projection content item in the IC card.

With the IC card terminal (IC card reader/writer) 118 provided in the projector 11, the audience can store identification information of a projection content item in an IC card and easily obtain a document used for a presentation by using the IC card.

<Functional Configuration of Projector>

Figure 4:
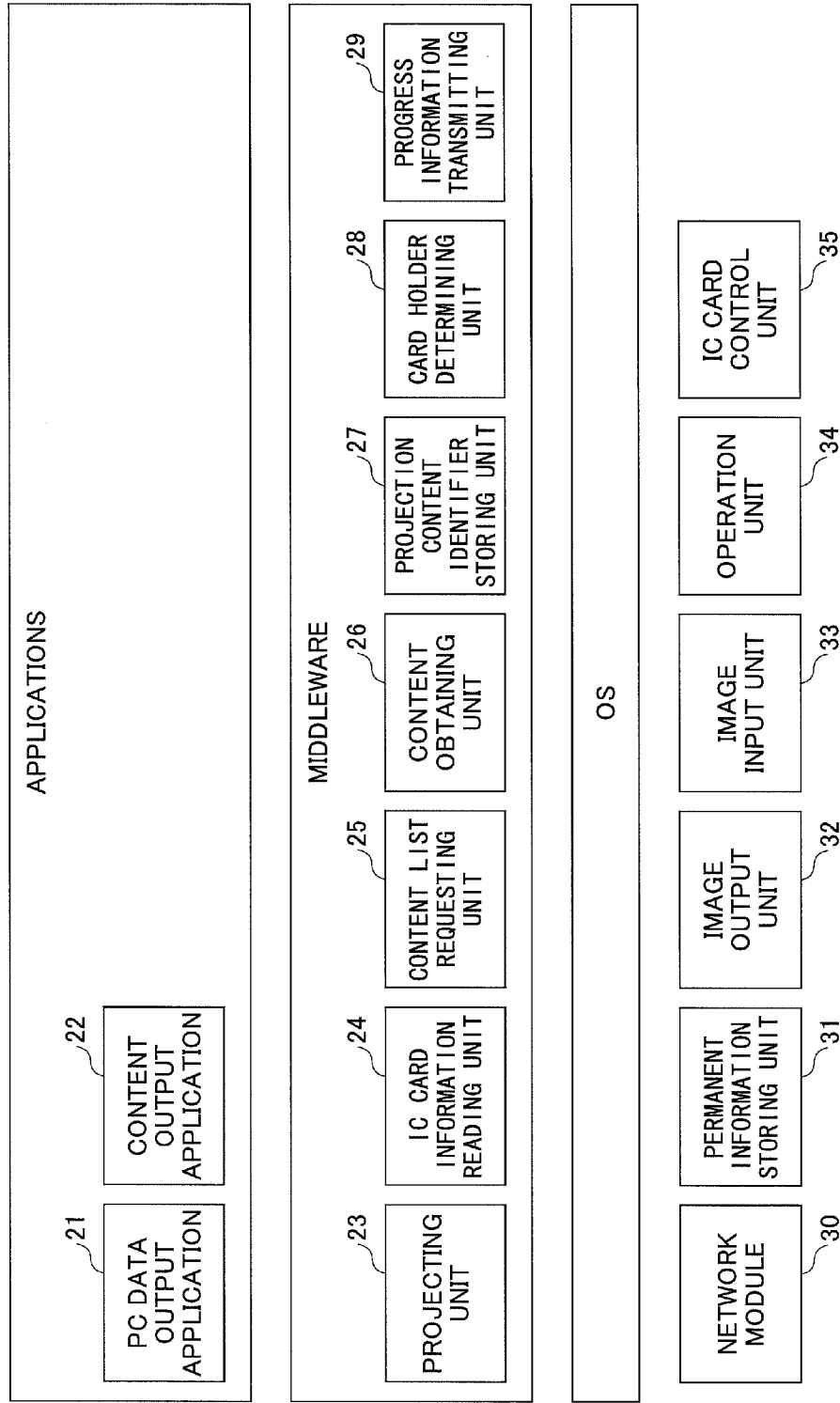
FIG. 4 is a block diagram illustrating an exemplary functional configuration of a projector.

An exemplary functional configuration of the projector 11 is described below with reference to FIG. 4.

The projector 11 may include a PC data output application 21 and a content output application 22. The projector 11 may also include, as middleware, a projecting unit 23, an IC card information reading unit 24, a content list requesting unit 25, a content obtaining unit 26, a projection content identifier storing unit 27, a card holder determining unit 28, and a progress information transmitting unit 29. The projector 11 may further include an operating system (OS), a network module 30, a permanent information storing unit 31, an image output unit 32, an image input unit 33, an operation unit 34, and an IC card control unit 35.

The PC data output application 21 causes the projecting unit 23 to project an image stream sent via a video cable from an information terminal such as a PC. The content output application 22 obtains a content item from the content server 12 and causes the projecting unit 23 to project the obtained content item.

The projecting unit 23 projects images and content items. The IC card information reading unit 24 reads information such as a card identifier from an IC card. The content list requesting unit 25 requests a list of content items from the content server 12. The content obtaining unit 26 obtains a content item from the content server 12 via the network I/F 113. The projection content identifier storing unit 27 stores a projection content identifier in an IC card. The card holder determining unit 28 asks an IC card holder whether he/she is a presenter or a member of the audience. Based on a response from the IC card holder, the card holder determining unit 28 determines whether the IC card holder is a presenter or a member of the audience. The progress information transmitting unit 29 sends, to the content server 12, content projection progress information (may be simply referred to as "progress information") indicating the progress in projecting a content item by the projecting unit 23.

The network module 30 controls network communications. The permanent information storing unit 31 controls input and output of data to and from the non-volatile memory 117. The image output unit 32 outputs images (or image signals) to the projecting unit 23. The image input unit 33 receives images (or image signals) from external devices. The operation unit 34 receives inputs (or operations) to the projector 11. The IC card control unit 35 controls reading and writing information from and to an IC card.

<Process Performed by Software of Projector>

When an IC card is held over the IC card terminal 118 of the projector 11, the IC card control unit 35 reports to the card holder determining unit 28 that the IC card is detected. In response, the card holder determining unit 28 causes the projecting unit 23 to project a query screen to ask the IC card holder whether he/she is a presenter or a member of the audience. When the IC card holder enters a response to the query screen, the operation unit 34 receives the response, and the card holder determining unit 28 controls a process based on the response.

When the IC card holder is a presenter, the IC card control unit 35 causes the IC card information reading unit 24 to read a card identifier from the IC card. Next, the content list requesting unit 25 sends the card identifier to the content server 12, and thereby requests the content server 12 to send a list of content items corresponding to the card identifier. When the content obtaining unit 26 receives the list of content items from the content server 12, the projecting unit 23 projects the list of content items.

When the presenter selects a projection content item from the list of content items, the content obtaining unit 26 requests the selected projection content item from the content server 12. When the projection content item is received from the content server 12, the content output application 22 causes the projecting unit 23 to project the projection content item. The progress information transmitting unit 29 sends content projection progress information to the content server 12.

Meanwhile, when the card holder determining unit 28 determines that the IC card holder is a member of the audience based on the response received by the operation unit 34, the projection content identifier storing unit 27 determines whether a projection content item is being projected by the projecting unit 23. When a projection content item is being projected, the projection content identifier storing unit 27 stores (or writes) the projection content identifier of the projection content item in the IC card.

The above configuration makes it possible to easily and reliably project content items and provide data of the projected content items to the audience.

<Hardware Configuration of Content Server>

Figure 5:
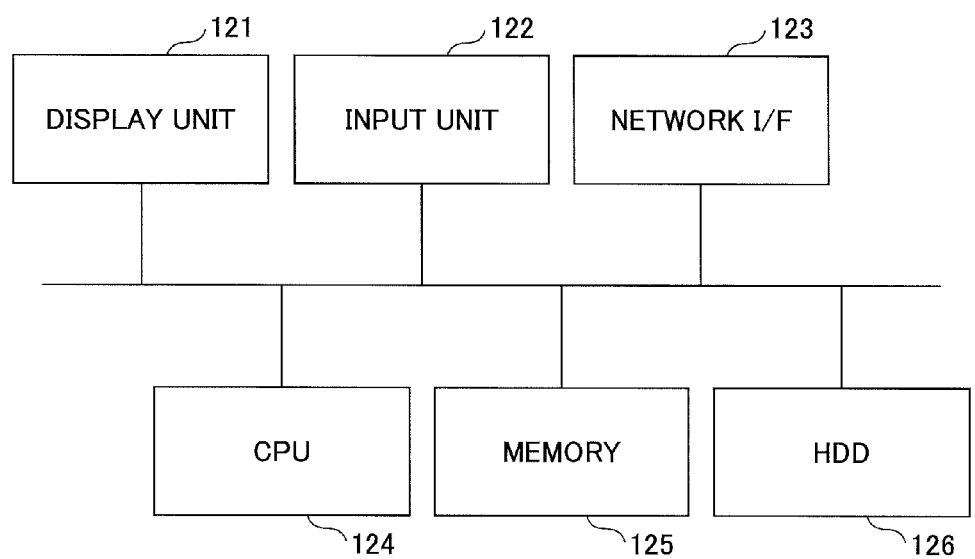
FIG. 5 is a block diagram illustrating an exemplary hardware configuration of a content server.

An exemplary hardware configuration of the content server 12 is described below with reference to FIG. 5.

The content server 12 may include a display unit 121, an input unit 122, a network I/F 123, a CPU 124, a memory 125, and an HDD 126. The display unit 121 displays, for example, messages and operational status of the content server 12. The input unit 122 includes, for example, a mouse and a keyboard for receiving user inputs and operations. The network I/F 123 is an interface for data communications. The CPU 124 is a central processing unit for controlling the content server 12. The memory 125 may be implemented by a read-only memory (ROM) and/or a random access memory (RAM), and stores data and programs necessary for processes performed by the content server 12. The HDD 126 stores content items, programs, and other data. When power is turned on, the CPU 124 reads programs from the HDD 126, loads the programs into the memory 125, and performs various processes according to the loaded programs.

<Process Performed by Hardware of Content Server>

When receiving a card identifier via the network I/F 123, the content server 12 refers to a content database stored in the HDD 126 and sends a list of content items corresponding to the card identifier to the projector 11. When a projection content item is requested by the projector 11, the content server 12 reads the projection content item from the HDD 126 and sends the projection content item via the network I/F 123 to the projector 11. Also, when a projection content identifier is received from the PC 13 via the network I/F 123, the content server 12 reads a projection content item corresponding to the projection content identifier from the HDD 126 and sends the projection content item to the PC 13.

Thus, the content server 12 is configured to perform processes according to information (i.e., identifiers) stored in IC cards. This configuration makes it possible to quickly and reliably send requested content items to the projector 11 and the PC 13.

<Functional Configuration of Content Server>

Figure 6:
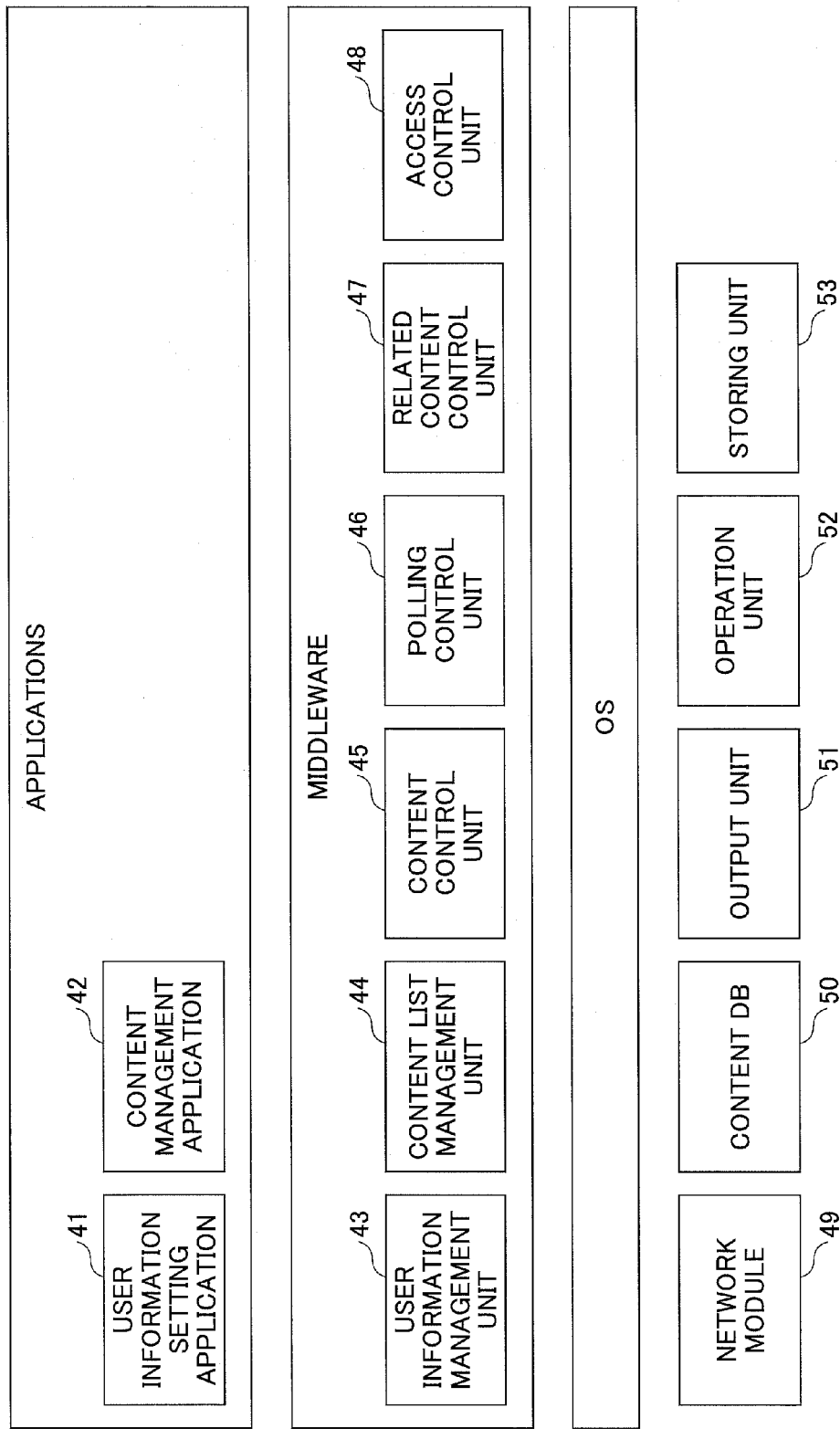
FIG. 6 is a block diagram illustrating an exemplary functional configuration of a content server.

An exemplary functional configuration of the content server 12 is described below with reference to FIG. 6.

The content server 12 may include applications such as a user information setting application 41 and a content management application 42. The content server 12 may also include, as middleware, a user information management unit 43, a content list management unit 44, a content control unit 45, a polling control unit 46, a related content control unit 47, and an access control unit 48. The content server 12 may further include a network module 49, a content database (DB) 50, an output unit 51, an operation unit 52, and a storing unit 53.

The user information setting application 41 adds (or registers) and removes users, and edits user information of registered users. The content management application 42 adds (or registers) and removes content items, and edits content information of registered content items. The user information management unit 43 centrally manages user information. The content list management unit 44 generates and sends lists of content items. The content control unit 45 controls input and output of data to and from the content DB 50, and manages content items.

The polling control unit 46 performs polling control in a process of sending projection content items to the audience. The related content control unit 47 searches the content DB 50 for content items related to a projection content item. The related content control unit 47 or a combination of the related content control unit 47 and the content control unit 45 may be referred to as a "related content transmitting unit". The access control unit 48 controls access from the PC 13 to the content server 12 (or to projection content items), i.e., restricts transmission of projection content items to the PC 13.

The network module 49 controls network connections of the content server 12. The content DB 50 stores content items and centrally manages information on the content items. The output unit 51 outputs information to apparatuses connected to the content server 12. The operation unit 52 receives user inputs and operations via the input unit 122. The storing unit 53 stores information such as card identifiers for access control, content projection progress information, and apparatus identification information for polling control.

<Process Performed by Software of Content Server>

When a card identifier of an IC card of a presenter is received from the projector 11, the content list management unit 44 refers to the content DB 50 and sends a list of content items corresponding to the card identifier to the projector 11. When a request for a projection content item is received from the projector 11, the content control unit 45 identifies the requested projection content item in the content DB 50 and sends the identified projection content item to the projector 11. Also, when a projection content identifier is sent from the PC 13 to request a projection content item, the content control unit 45 reads the corresponding projection content item from the content DB 50, and sends the projection content item via the network module 49 to the PC 13. The content control unit 45 may be referred to as a "projection content transmitting unit".

While a content item is being projected by the projector 11, the content control unit 45 receives content projection progress information from the projector 11 and stores the content projection progress information in the storing unit 53. When the content server 12 is configured to send, to the audience (i.e., the PC 13), only parts (e.g., slides or pages) of a projection content item that have already been projected, the content control unit 45 performs a process as described below. When receiving a request for a projection content item (i.e., a projection content identifier) from the PC 13, the content control unit 45 identifies the projection content item corresponding to the projection content identifier, and also refers to content projection progress information stored in the storing unit 53. Based on the content projection progress information, the content control unit 45 sends data of only parts (e.g., pages or slides) of the identified projection content item that have already been projected, via the network module 49 to the PC 13.

When the content server 12 is configured to send a projection content item to the PC 13 of the audience through a polling process, the polling control unit 46 controls the polling process. For example, when a request for a projection content item is received from the PC 13, the user information management unit 43 records apparatus identification information of the PC 13. The polling control unit 46 regularly polls the PC 13 corresponding to the recorded apparatus identification information, and sends differential data of the projection content item to the PC 13. Here, differential data of a projection content item indicate data of parts of the projection content item that have already been projected but have not been sent to the PC 13.

The PC 13 to which differential data of a projection content item is sent through a polling process may be identified based on a card identifier of an IC card, instead of the apparatus identification information of the PC 13. In this case, when an IC card is held over the PC 13, the PC 13 reads a card identifier together with a projection content identifier from the IC card, and sends the card identifier and the projection content identifier to the content server 12. At the content server 12, the polling control unit 46 controls a polling process based on the card identifier. The above configuration enables the audience of a presentation to smoothly and easily obtain and view the latest pages (or slides) of a projection content item at its own PC in accordance with the progress of the presentation.

The related content control unit 47 enables the audience to obtain content items related to a projection content item. Assume that the audience queries, via the PC 13, the content server 12 about content items related to a projection content item "accounting_report_2011-01". When receiving the query from the PC 13 via the network module 49, the related content control unit 47 searches the content DB 50 for content items related to the projection content item, and sends a list of found related content items to the PC 13. When the audience selects a related content item "accounting_report_2010-12" from the list of related content items at the PC 13, the content control unit 45 retrieves the selected related content item from the content DB 50 and sends the retrieved related content item to the PC 13. A similar process may be initiated by the presenter to project a related content item by the projector 11.

With a user management function and a content management function (e.g., the applications and the middleware in FIG. 6), the content server 12 of the present embodiment can flexibly and reliably provide content items requested using IC cards.

<Content DB>

An exemplary configuration of the content DB 50 is described below with reference to FIGS. 7A through 7C.

FIG. 7A illustrates a table of the content DB 50 where file names of content items, owners of the content items, and dates when the content items are stored are associated with projection content identifiers. FIG. 7B illustrates another table of the content DB 50 where projection content identifiers, file names, and dates are associated with card identifiers. When a card identifier of an IC card of a presenter is received from the projector 11, the content server 12 searches the table of FIG. 7B to find content items associated with the card identifier, and sends a list of found content items to the projector 11. FIG. 7C illustrates a table of the content DB 50 that includes a list of related content items related to a selected projection content item. The table of FIG. 7C may be dynamically generated when related content items are requested.

The content DB 50 may also be configured to store data (content items) in association with identifiers of information processing terminals (PCs 13) or identifiers of users in the networked data projecting system 1. The content DB 50 may be updated as needed using a PC connected to the content server 12.

<Hardware Configuration of PC>

Figure 8:
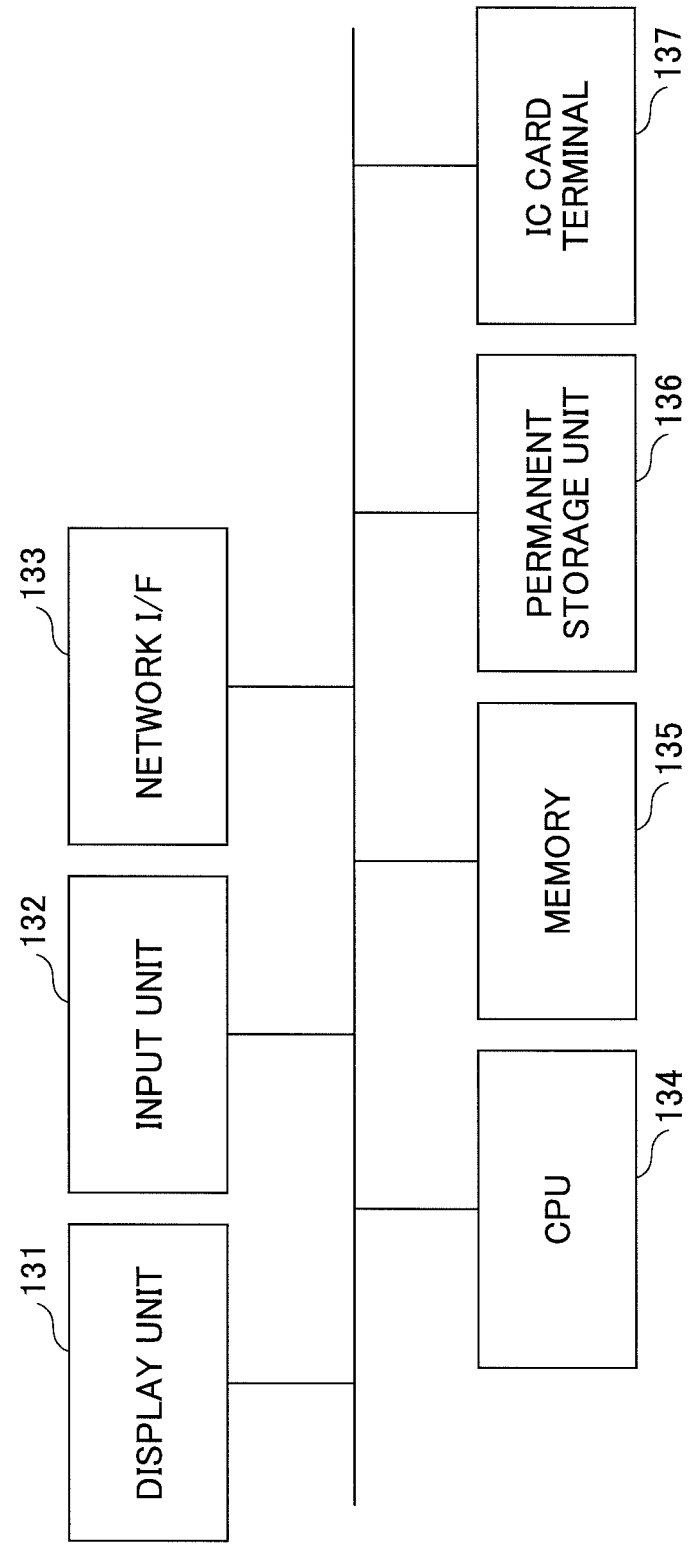
FIG. 8 is a block diagram illustrating an exemplary hardware configuration of a personal computer.

An exemplary hardware configuration of the PC 13 is described below with reference to FIG. 8.

The PC 13 may include a display unit 131, an input unit 132, a network I/F 133, a CPU 134, a memory 135, a permanent storage unit 136, and an IC card terminal 137. The display unit 131 displays, for example, messages and operational status of the PC 13. The input unit 132 includes, for example, a mouse and a keyboard for receiving user inputs and operations. The network I/F 133 is an interface that connects the PC 13 with the projector 11 and the content server 12 for data communications. The CPU 134 is a central processing unit for controlling the PC 13. The memory 135 stores programs and data necessary for calculations and processing. The permanent storage unit 136 continuously (or permanently) stores programs and data. The IC card terminal 137 reads and writes information from and to an IC card.

<Process Performed by Hardware of PC>

According to the present embodiment, the CPU 134 performs a process as described below. In order to obtain data of a projection content item being currently projected, the audience first holds an IC card over the IC card terminal 118 of the projector 11 to store a projection content identifier of the projection content item in the IC card. Next, the audience holds the IC card storing the projection content identifier over the IC card terminal 137 of the PC 13. The IC card terminal 137 reads the projection content identifier from the IC card. The CPU 134 sends the projection content identifier via the network I/F 133 to the content server 12 to request the projection content item. When receiving the projection content item from the content server 12 via the network I/F 133, the CPU 134 stores the projection content item in the memory 135 and displays the projection content item on the display unit 131.

With the above configuration, the audience can easily and reliably obtain a projection content item by just holding an IC card storing a projection content identifier over the IC card terminal 137.

<Functional Configuration of PC>

Figure 9:
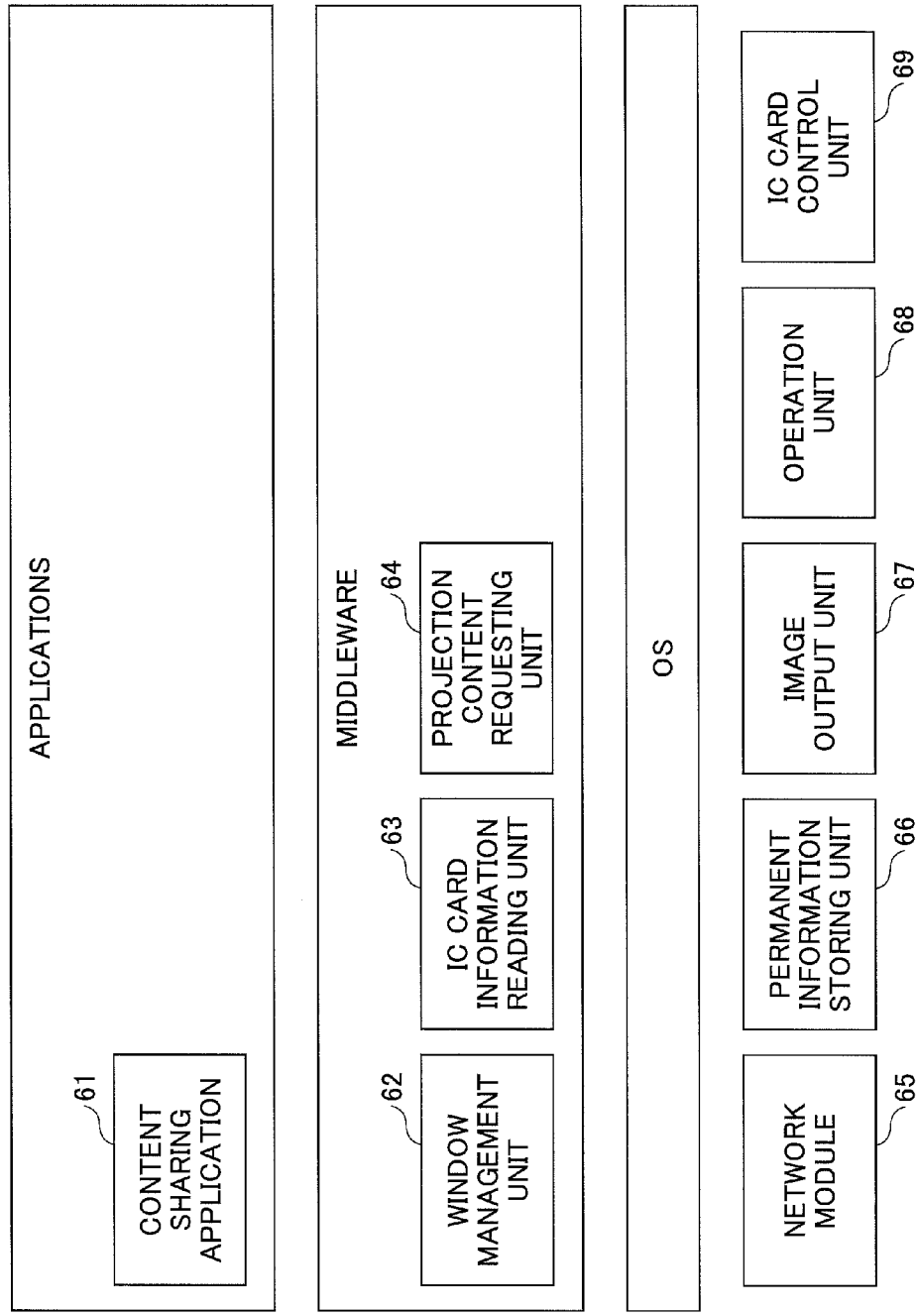
FIG. 9 is a block diagram illustrating an exemplary functional configuration of a personal computer.

Next, an exemplary functional configuration of the PC 13 is described with reference to FIG. 9. The PC 13 may be implemented by a general-purpose information processing terminal including an IC card reader. The functional configuration of the PC 13 described below is just an example.

The PC 13 may include a content sharing application 61. The PC 13 may also include, as middleware, a window management unit 62, an IC card information reading unit 63, and a projection content requesting unit 64. The PC 13 may further include an operating system (OS), a network module 65, a permanent information storing unit 66, an image output unit 67, an operation unit 68, and an IC card control unit 69.

The content sharing application 61 analyzes information read from an IC card and thereby determines an identifier of a projection content item to be obtained. The content sharing application 61 also displays an obtained projection content item on the display unit 131. The window management unit 62 manages screens where content items are displayed. The IC card information reading unit 63 reads information such as a card identifier and a projection content identifier from an IC card. The projection content requesting unit 64 sends the card identifier and/or the projection content identifier to the content server 12 to request a projection content item.

The network module 65 controls network connections of the PC 13. The permanent information storing unit 66 controls input and output of information to and from the memory 135 and the permanent storage unit 136. The image output unit 67 outputs images (or image signals) to the display unit 131. The operation unit 68 receives user inputs and operations via the input unit 132. The IC card control unit 69 controls input and output of information to and from an IC card.

<Process Performed by Software of PC>

In order to obtain a projection content item, the audience first holds an IC card over the IC card terminal 118 of the projector 11 to store a projection content identifier of the projection content item in the IC card. When the audience holds the IC card storing the projection content identifier over the IC card terminal 137 of the PC 13, the IC card information reading unit 63 reads the projection content identifier from the IC card. The projection content requesting unit 64 sends the read projection content identifier to the content server 12 to request the projection content item. When the projection content item is received from the content server 12, the content sharing application 61 displays the projection content item on the display unit 131.

With the above configuration, the audience can easily and reliably obtain a projection content item by just holding an IC card storing a projection content identifier over the IC card terminal 137 of the PC 13.

<Data Structure of IC Card>

Next, an exemplary data structure of an IC card is described with reference to FIG. 10.

Figure 10:
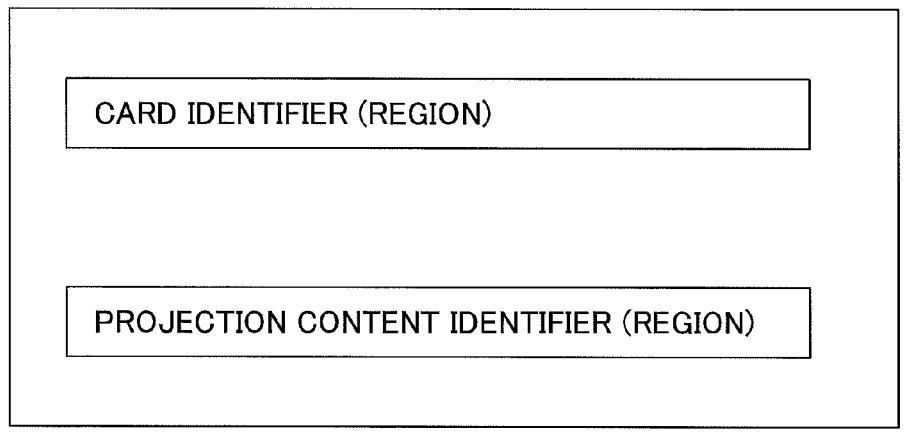
FIG. 10 is a drawing illustrating an exemplary data structure of an IC card.

As illustrated in FIG. 10, an IC card of the present embodiment may include a card identifier region and a projection content identifier region. A card identifier unique to the IC card is stored in advance in the card identifier region. The card identifier may be associated with information on the owner (or the holder) of the IC card. Initially, the projection content identifier region does not store any information. When the audience holds the IC card over the projection 11 while a projection content item is being projected, the projection content identifier of the projection content item is stored in the projection content identifier region.

<Process Performed in Networked Data Projecting System of First Embodiment>

An exemplary process performed in the networked data projecting system 1 according to the first embodiment is described below with reference to FIG. 11.

In step S301, an IC card holder holds an IC card over the IC card terminal 118 of the projector 11, and the projector 11 projects a screen for asking the IC card holder whether he/she is a presenter or a member of the audience. When the IC card holder enters a response indicating that he/she is a presenter (YES in S302), the process proceeds to step S303 and the projector 11 reads a card identifier from the IC card. Meanwhile, when the IC card holder enters a response indicating that he/she is a member of the audience (NO in S302), the process proceeds to step S313.

In step S304, the projector 11 sends the card identifier to the content server 12. In step S305, the content server 12 searches the content DB 50 based on the card identifier, and sends a list of content items associated with the card identifier to the projector 11. In step S306, the projector 11 projects the list of content items received from the content server 12. In step S307, the presenter selects a projection content item from the list of content items projected by the projector 11.

In step S308, the projector 11 requests content server 12 to send the selected projection content item. In step S309, the content server 12 sends the requested projection content item to the projector 11. In step S310, the projector 11 projects the projection content item received from the content server 12.

Step S311 and subsequence steps are related to the audience. In step S311, an IC card holder holds an IC card over the IC card terminal 118 of the projector 11, and the projector 11 projects a screen for asking the IC card holder whether he/she is a presenter or a member of the audience. When the IC card holder is a member of the audience (YES in S312), the process proceeds to step S313. Meanwhile, when the IC card holder is a presenter, the process returns to step S303. In step S313, the projector 11 determines whether a projection content item is being projected. When a projection content item is being projected (YES in S313), the process proceeds to step S314. Meanwhile, when no projection content item is being projected (NO in S313), the process is terminated because there is no projection content identifier to be stored in the IC card of the audience.

In step S314, the projection content identifier storing unit 27 of the projector 11 stores the projection content identifier of the projection content item in the IC card. In step S315, the audience holds the IC card over the IC card terminal 137 of the PC 13, and the PC 13 reads the projection content identifier from the IC card. In step S316, the projection content requesting unit 64 of the PC 13 sends the projection content identifier to the content server 12 to request the projection content item. In step S317, the content control unit 45 of the content server 12 sends the requested projection content item to the PC 13. In step S318, the PC 13 displays the projection content item received from the content server 12.

Through the above process, the presenter can easily obtain and project a desired projection content item using an IC card, and the audience can easily obtain the projection content item also using an IC card storing a projection content identifier.

<Variation>

In the above embodiment, when an IC card is held over the projector 11 by a card holder, the projector 11 asks the card holder whether he/she is a presenter or a member of the audience. Alternatively, the projector 11 may be configured to identify a card holder as a presenter when an IC card is held over the projector 11 for the first time after the projector 11 is turned on, and to identify a card holder as a member of the audience when an IC card is held over the projector 11 for the second time and thereafter. In this case, when an IC card is held over the projector 11 for the first time after it is turned on, the projector 11 automatically reads a card identifier from the IC card, and sends the card identifier to the content server 12 to request a list of content items.

<<Second Embodiment>>

Next, a second embodiment is described. In the second embodiment, card identifiers of IC cards of audience are managed by the content server 12, and transmission of projection content items to the PCs 13 is restricted based on the card identifiers.

This configuration is described below in detail. When an IC card is held over the projector 11 by the audience, the projector 11 stores a projection content identifier in the IC card and also reads a card identifier from the IC card. Then, the projector 11 sends the read card identifier to the content server 12, and the content server 12 receives and stores the card identifier. When the audience holds the IC card over the PC 13, the PC 13 reads the projection content identifier and the card identifier from the IC card, and sends the projection content identifier and the card identifier to the content server 12 to request a projection content item.

When receiving the projection content identifier and the card identifier (i.e., a request for a projection content item) from the PC 13, the content server 12 determines whether the received card identifier is stored in the content server 12 (or the received card identifier exists in stored card identifiers). When the received card identifier is stored in the content server 12, the content server 12 determines that the IC card has been held over the projector 11, authorizes access for the audience to the content server 12 (or the projection content item), and sends the projection content item to the PC 13.

An exemplary process in the networked data projecting system 1 according to the second embodiment is described below with reference to FIG. 12.

In steps S401 through S411, the presenter holds an IC card over the projector 11, a projection content item is projected by the projector 11, and content projection progress information is sent to and stored in the content server 12. Since these steps are substantially the same as steps S101 through S111 of FIG. 2, their detailed descriptions are omitted here.

In step S412, while the projection content item is being projected, the audience holds an IC card over the projector 11. In step S413, similarly to the first embodiment, the projection content identifier storing unit 27 of the projector 11 stores the projection content identifier of the projection content item in the IC card. In the second embodiment, in step S414, the IC card information reading unit 24 of the projector 11 reads the card identifier from the IC card of the member of the audience. The IC card information reading unit 24 may be referred to as a "card identifier transmitting unit". In step S415, the projector 11 sends the card identifier to the content server 12. In step S416, the content server 12 stores the card identifier received from the projector 11 in the storing unit 53.

In step S417, the audience holds the IC card over the PC 13, and the PC 13 reads the projection content identifier and the card identifier from the IC card. In step S418, the PC 13 sends the projection content identifier and the card identifier to the content server 12 to request the projection content item. In step S419, the access control unit 48 of the content server 12 determines whether the card identifier received from the PC 13 is stored in the storing unit 53.

When the card identifier is stored in the storing unit 53, the access control unit 48 authorizes access for the member of the audience who holds the IC card (or by the PC 13 sending the card identifier). In this case, the content control unit 45 of the content server 12 sends the projection content item corresponding to the projection content identifier to the PC 13. Meanwhile, when the card identifier is not stored in the storing unit 53, i.e., when the IC card has not been held over the projector 11, the access control unit 48 does not authorize access for the member of the audience who holds the IC card. In this case, the projection content item is not sent to the PC 13, and the process is terminated.

With the function to determine whether to authorize access to the content server 12 (or projection content items), the content server 12 can restrict transmission of projection content items to the audience (or the PCs 13). This configuration, for example, makes it possible to prevent transmission of a projection content item to an unauthorized user who obtained a projection content identifier in a dishonest manner, and thereby makes it possible to improve the security of the networked data projecting system 1.

An aspect of this disclosure provides a networked data projecting system, a projector, and a content projecting method that make it possible to easily and reliably obtain a content item that is being projected.

A networked data projecting system, a projector, and a content projecting method of preferred embodiments are described above. However, the present invention is not limited to the specifically disclosed embodiments, and variations and modifications may be made without departing from the scope of the present invention.

What is claimed is:

1. A networked data projecting system, comprising:
a server configured to store one or more content items;
a projector connected to the server and configured to project a projection content item selected from the content items stored in the server; and
an information processing terminal connected to the server, wherein
the projector includes
an IC card terminal configured to read and write information from and to an IC card, and
a projection content identifier storing unit configured to store an identifier of the IC card and a projection content identifier of the projection content item that is presently projected by the projector based on an IC authorization being successfully performed in the IC card, said identifier of the IC card and the projection content identifier of the projection content item being stored in association with each other;
the information processing terminal includes a projection content requesting unit configured to read the projection content identifier stored in the IC card and send the projection content identifier to the server to request the projection content item corresponding to the projection content identifier; and
the server includes a projection content transmitting unit configured to send the projection content item corresponding to the projection content identifier to the information processing terminal when the projection content transmitting unit receives an identifier of the IC card that is identical to the identifier of the IC card that is stored by the projection content identifier storing unit,
wherein the projector further includes a progress information transmitting unit configured to send, to the server, content projection progress information indicating a projection content item that has been already projected on the projector; and
the projection content transmitting unit of the server is configured to send only the projection content item that has been already projected on the projector to the information processing terminal based on the content projection progress information so that the information processing terminal receives only the projection content item that has been already projected on the projector.

2. The networked data projecting system as claimed in claim 1, wherein the projection content transmitting unit of the server is configured to send, to the information processing terminal, a difference between a part of the projection content item that has been projected and a part of the projection content item that has already been sent to the information processing terminal, by using a polling method.

3. The networked data projecting system as claimed in claim 1, wherein the server further includes a related content transmitting unit configured to
generate a list of related content items related to the projection content item in response to a query from the information processing terminal,
send the list of related content items to the information processing terminal, and
send a related content item selected at the information processing terminal from the list of related content items to the information processing apparatus.

4. The networked data projecting system as claimed in claim 1, wherein
the projector further includes a card identifier transmitting unit configured to read a card identifier from the IC card held over the IC card terminal and send the card identifier to the server;
the projection content requesting unit of the information processing terminal is configured to also read the card identifier from the IC card and send the card identifier together with the projection content identifier to the server; and
the projection content transmitting unit of the server is configured to send the projection content item to the information processing terminal when the card identifier sent from the projection content requesting unit of the information processing terminal matches the card identifier sent from the card identifier transmitting unit of the projector.

5. The networked data projecting system as claimed in claim 1, wherein the server is configured to store the content items in association with at least one of
card identifiers of IC cards,
identifiers of information processing terminals, and
user identifiers.

6. The networked data projecting system as claimed in claim 1, wherein when the content projection progress information indicates that n pages out of a total number of pages of a projection material have been already projected on the projector, the projection content transmitting unit of the server sends only projection content items that correspond to the n pages of the projection material to the information processing terminal based on the content projection progress information so that the information processing terminal receives only the projection content items that correspond to the n pages of the projection material.

7. A projector connected to a server storing one or more content items and an information processing terminal, the projector comprising:
   a projecting unit configured to project a projection content item selected from the content items stored in the server;
   an IC card terminal configured to read and write information from and to IC cards; and
   a projection content identifier storing unit configured to store an identifier of the IC card and a projection content identifier of the projection content item that is presently projected by the projector based on an IC authorization being successfully performed in a first IC card of the IC cards, said identifier of the IC card and the projection content identifier of the projection content item being stored in association with each other,
   wherein the projection content identifier stored in the first IC card is used by the information processing terminal to request the projection content item from the server, and
   wherein the server includes a projection content transmitting unit configured to send the projection content item corresponding to the projection content identifier to the information processing terminal when the projection content transmitting unit receives an identifier of the IC card that is identical to the identifier of the IC card that is stored by the projection content identifier storing unit,
   wherein the projector further includes a progress information transmitting unit configured to send, to the server, content projection progress information indicating a projection content item that has been already projected on the projector; and
   the projection content transmitting unit of the server is configured to send only the projection content item that has been already projected on the projector to the information processing terminal based on the content projection progress information so that the information processing terminal receives only the projection content item that has been already projected on the projector.

8. The projector as claimed in claim 7, further comprising:
   a card identifier transmitting unit configured to read a first card identifier from the first IC card held over the IC card terminal and send the first card identifier to the server.

9. The projector as claimed in claim 7, further comprising:
   a content list requesting unit configured to send, to the server, a second card identifier read from a second IC card of the IC cards held over the IC card terminal, and thereby request a list of content items corresponding to the second card identifier from the server; and
   a projection content obtaining unit configured to request the server to send the projection content item selected by a user from the list of content items,
   wherein the projecting unit is configured to project the projection content item sent from the server.

10. The projector as claimed in claim 7, further comprising:
    a card holder determining unit configured to determine whether a card holder holding the first IC card is a presenter or a member of audience of a presentation,
    wherein the projection content identifier storing unit is configured to store the projection content identifier of the projection content item in the first IC card when the card holder is the member of the audience.

11. A method for a networked data projecting system including a server that stores one or more content items, a projector that includes an IC card terminal and projects a projection content item selected from the content items stored in the server, and an information processing terminal that is connected to the server, the method comprising:
    when an IC card is held over the IC card terminal while the projection content item is being projected by the projector, storing, by the projector, an identifier of the IC card and a projection content identifier of the projection content item that is presently projected by the projector based on an IC authorization being successfully performed in the IC card, said identifier of the IC card and the projection content identifier of the projection content item being stored in association with each other;
    reading, by the information processing terminal, the projection content identifier stored in the IC card;
    sending, by the information processing terminal, the projection content identifier to the server to request the projection content item corresponding to the projection content identifier; and
    sending, by the server, the projection content item corresponding to the projection content identifier to the information processing terminal when the projection content transmitting unit receives an identifier of the IC card that is identical to the identifier of the IC card that is stored by the projection content identifier storing unit,
    wherein the method further includes steps of:
    sending, by a progress information transmitting unit provided to the projector, to the server, content projection progress information indicating a projection content item that has been already projected on the projector; and
    sending, by a projection content transmitting unit provided to the server, only the projection content item that has been already projected on the projector to the information processing terminal based on the content projection progress information so that the information processing terminal receives only the projection content item that has been already projected on the projector.

* * * * *